(12) United States Patent
Kerkar et al.

(10) Patent No.: US 6,302,955 B1
(45) Date of Patent: *Oct. 16, 2001

(54) COMPOSITION FOR IMPROVING FREEZE/THAW DURABILITY OF MASONRY CONTAINING FATTY ACID-BASED EFFLORESCENCE CONTROL AGENTS

(75) Inventors: Awdhoot V. Kerkar, Chelmsford; Kati Hazrati, Arlington, both of MA (US)

(73) Assignee: W. R. Grace & Co.-Conn., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/416,785

(22) Filed: Oct. 13, 1999

Related U.S. Application Data

(60) Provisional application No. 60/126,520, filed on Mar. 26, 1999, and provisional application No. 60/106,954, filed on Nov. 4, 1998.

(51) Int. Cl.$^7$ ............ C04B 24/02; C04B 27/32
(52) U.S. Cl. ............ 106/802; 106/724; 106/726; 106/727; 106/728; 106/806; 106/808; 106/810; 106/823; 524/6
(58) Field of Search ............ 106/802, 806, 106/808, 810, 823, 724, 726, 727, 728; 524/6

(56) References Cited

U.S. PATENT DOCUMENTS

| | | | |
|---|---|---|---|
| 3,663,251 | 5/1972 | Moren et al. | 106/725 |
| 4,116,706 | 9/1978 | Previte | 106/727 |
| 4,209,336 | 6/1980 | Previte | 106/724 |
| 4,209,337 | 6/1980 | Wagner et al. | 106/671 |
| 4,223,732 | 9/1980 | Carriay et al. | 106/291 |
| 4,547,223 | 10/1985 | Goto et al. | 106/802 |
| 4,814,014 | 3/1989 | Arfaei | 106/724 |
| 4,960,465 | 10/1990 | Arfaei | 106/724 |
| 4,992,104 | 2/1991 | Boultevin | 106/724 |
| 5,099,922 | 3/1992 | Ganguli | 166/293 |
| 5,133,409 | 7/1992 | Blour et al. | 166/393 |
| 5,147,565 | 9/1992 | Blour et | 252/8.551 |
| 5,174,820 | 12/1992 | Sakuta et al. | 106/724 |
| 5,213,161 | 5/1993 | King et al. | 166/293 |
| 5,220,960 | 6/1993 | Totten et al. | 166/293 |
| 5,281,270 | 1/1994 | Totten et al. | 106/687 |
| 5,298,069 | 3/1994 | King et al. | 106/686 |
| 5,298,070 | 3/1994 | Cowan | 106/724 |
| 5,330,006 | 7/1994 | Nahm et al. | 166/293 |
| 5,679,150 | 10/1997 | Kerkar et al. | 106/808 |

FOREIGN PATENT DOCUMENTS

| | | |
|---|---|---|
| 2096591A | 3/1982 | (GB) . |
| 2292141A | 8/1995 | (GB) . |
| 55-47259 | 4/1980 | (JP) . |
| 58-60293 | 4/1983 | (JP) . |
| 58-140364 | 8/1993 | (JP) . |
| 07-291762 | * 11/1995 | (JP) . |

OTHER PUBLICATIONS

UK Search Report, The Patent Office, Feb. 7, 2000, 1 page.
Chemical Admixtures for Concrete, M.R. Rixam and Rixom and N.P. Mailvaganam, E. & F.N. Spon, London, New York, pp. 97–100. (1986) (No Month).
Triton X–Series Surfactants, Nonionic Octylphenol Polyether Alcohols, Union Carbide Corporation, 1997, pp. 1–20. (No Month).

* cited by examiner

*Primary Examiner*—Anthony Green
(74) *Attorney, Agent, or Firm*—Craig K. Leon; William L. Baker

(57) ABSTRACT

A composition for improving the freeze thaw durability of masonry concrete comprising (i) an alkylaryl polyether alcohol having the formula R-Ø-(OCH$_2$CH$_2$)$_x$OH, wherein R is a C$_4$–C$_8$ alkyl group (preferably branched), Ø represents a phenol group, and "X" represents an integer in the range of 3–70; and (ii) at least one efflorescence control admixture, such as a C$_8$–C$_{30}$ fatty acid or its salt or derivative. An exemplary masonry concrete composition of the invention comprises an alkylaryl polyether alcohol having the formula R-Ø-(OCH$_2$CH$_2$)$_x$OH, wherein R is a C$_4$–C$_8$ alkyl group, Ø represents a phenol group, and "X" represents an integer in the range of 3–70; the composition, when wet, having essentially zero slump when tested by the standard cone method for measuring slump. Methods of improving the freeze-thaw durability of masonry units are also disclosed.

18 Claims, 3 Drawing Sheets

COMPOSITION FOR IMPROVING FREEZE/THAW DURABILITY OF MASONRY CONTAINING FATTY ACID-BASED EFFLORESCENCE CONTROL AGENTS

This application claims priority to U.S. Provisional Patent Application Ser. No. 60/126,520 filed Mar. 26, 1999; U.S. Provisional Patent Application Ser. No. 60/106,954 filed Nov. 4, 1998; and is related to U.S. patent application Ser. No. 09/408,255 which was a regular patent application based on Ser. No. 60/106,954 and having the same title and which was filed on Sep. 29, 1999.

FIELD OF THE INVENTION

The present invention relates to compositions and methods for improving freeze-thaw durability in masonry units, and more particularly to the use of certain nonionic alkylaryl polyether alcohols, which may be successfully used in combination with efflorescence control admixtures, in masonry concrete and concrete masonry units.

BACKGROUND OF THE INVENTION

Masonry units, sometimes referred to as concrete masonry units (CMUs), include segmental retaining wall (SRW) units, pavers, and architectural blocks, all of which are made from a "masonry concrete" which is comprised of hydratable cement binder and fine aggregate (e.g., particles of which less than 5% have a diameter greater than 0.375 inch). Masonry concrete lacks the coarse aggregate (typically greater than 0.5 inch diameter) that is further used in conventional concrete, such as, for example, ready-mix concrete.

More significantly, masonry concrete differs from conventional concrete because it is said to have zero "slump," or, to employ a more accurate definition, it is said to have a practically immeasurable fluidity. The slump property is determined by placing wet masonry concrete into an inverted cone and then removing the cone, and measuring the distance (if any) by which the cone-molded sample drops in height. See ASTM C143 (1988) ("Standard Test Method for Slump of Portland Cement Concrete"). Typically, the slump of masonry concrete is 0–0.75 inches, and thus masonry concrete is said to have an essentially "zero slump."

The present inventors believe that the use of fatty acid-based efflorescence control admixtures (ECAs), which are sometimes referred to as integral water repellants, such as calcium stearate dispersion, fatty acids and their salts and esters, etc., can cause an appreciable loss of freeze-thaw durability in masonry units (e.g., made of zero slump masonry concrete). Efflorescence is the appearance of white, patchy stains on the face of masonry units during their manufacture or after their installation in the field. Once installed in the field, the masonry blocks are subjected to routine weathering conditions, one of them being alternate freezing and thawing (F/T) cycles. Recent testing of F/T durability of masonry units (SRW), using the ASTM C1262 (1995) test method in the lab, revealed severe adverse effects of ECAs on the F/T durability of masonry units.

Accordingly, an improved masonry concrete admixture, masonry concrete having improved freeze/thaw durability, and methods for making these, are urgently needed.

SUMMARY OF THE INVENTION

The present invention concerns the inventors' surprising discovery that certain surfactants improve freeze/thaw ("F/T") durability of masonry units containing efflorescence control agents, and especially when F/T durability is tested pursuant to ASTM C1262 (1995).

An illustrative composition of the invention for improving F/T durability comprises (i) a nonionic alkylaryl polyether alcohol having the general formula R-Ø-(OCH$_2$CH$_2$)$_x$OH, wherein R is a C$_4$–C$_8$ alkyl group (most preferably, a branched octyl group), Ø represents a phenol group, and "X" represents an integer in the range of 3–70; and (ii) an efflorescence control admixture selected from calcium stearate, fatty acids and their salts and esters (e.g., C$_4$–C$_{22}$ fatty acid or its salt or derivative), polyvinyl alcohol, silanes, and siloxanes and latexes (e.g., acrylic, butadiene, etc.). An exemplary fatty acid (salt) may comprise calcium stearate in dispersion form.

Another illustrative embodiment of the present invention is a masonry composition which comprises (i) a hydratable cement binder (5–25% based on total dry weight of the composition); (ii) a fine aggregate portion (80 to 95% based on total dry weight of the composition of particles of which less than 5% have a diameter of greater than 0.375 inch); and (iii) an alkylaryl polyether alcohol having the formula R-Ø-(OCH$_2$CH$_2$)$_x$OH, wherein R is a C$_4$–C$_8$ alkyl group, Ø represents a phenol group, and "X" represents an integer in the range of 3–70 (said alkylaryl polyether alcohol being present in the composition in the amount of 0.001–5.0% (s/s cement); the composition, when wet, having essentially zero slump when tested by ASTM C143 (1988) (standard cone test for measuring slump). The exemplary masonry composition may further comprise an efflorescence control admixture (e.g., a fatty acid or its salt or derivative (e.g., C$_4$–C$_{22}$); e.g, calcium stearate), and/or optionally a betaine as a further F/T durability improving component.

Exemplary methods for improving the freeze/thaw durability of masonry units comprises incorporating the above-described alkylaryl polyether alcohol, either separately or together with (a) an efflorescence control admixture (such as a fatty acid or its salt or derivative) and/or (b) a betaine.

An exemplary method of the invention for making a freeze/thaw durability admixture for masonry concrete comprises (i) providing an efflorescence control admixture (e.g., fatty acid or its salt or derivative); (ii) optionally heating the efflorescence control admixture (it if it is not in liquid form) so as to render it into liquid form; (iii) combining said efflorescence control admixture while in liquid form with a hydroxide solution (e.g., calcium hydroxide, potassium hydroxide, sodium hydroxide, lithium hydroxide, etc.). If the efflorescence control admixture is a fatty acid, this method will obtain the salt of the fatty acid, and the hydroxide solution may further comprise an alkylaryl polyether alcohol having a C$_4$–C$_8$ alkyl group (preferably, branched octyl group). Optionally, but preferably, this dispersion is milled or ground to reduce the size of dispersed particles (e.g., fatty acid salt particles within the aqueous dispersion).

Further features and advantages of the invention are provided hereinafter.

BRIEF DESCRIPTION OF THE DRAWING

A comprehension of the following detailed description may be facilitated by reference to the accompanying figures, wherein.

DETAILED DESCRIPTION OF EXEMPLARY EMBODIMENTS

Figure 1:
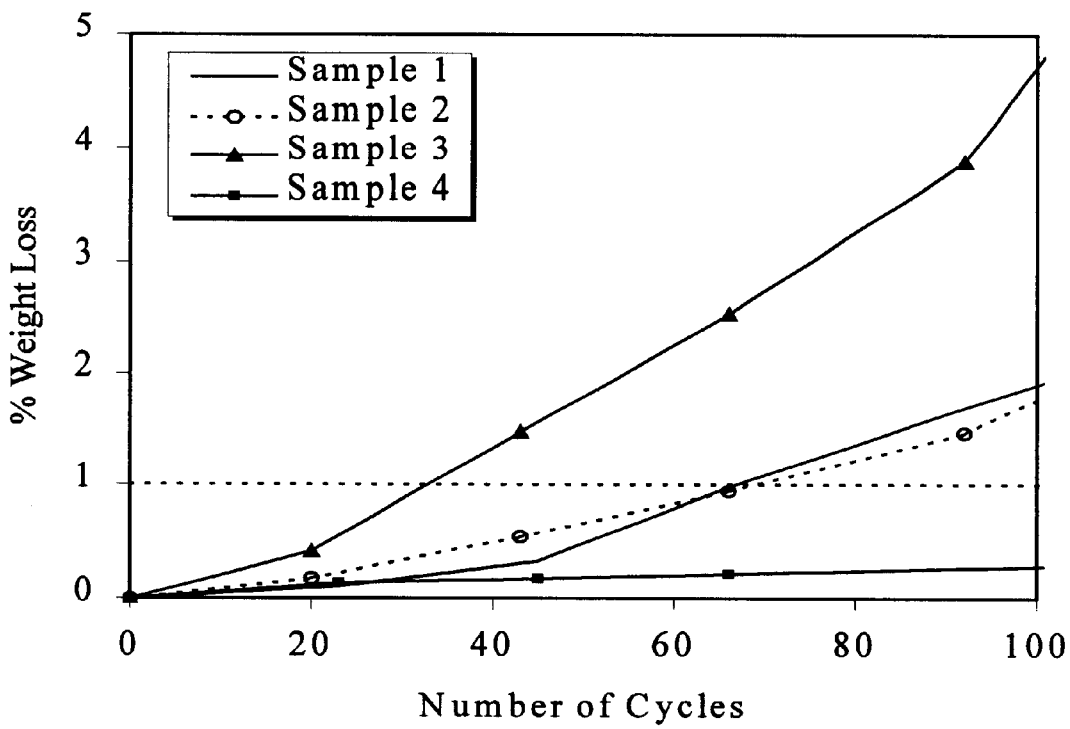
FIGS. 1, 2, 3 and 4 are graph results of freeze-thaw testing on masonry concrete samples corresponding to the Examples provided hereinafter.

The term "masonry concrete" as used herein shall mean and refer to a cementitious composition containing a Portland cement 5–25% (s/s total dry weight composition) and 75–95% (s/s total dry weight composition) of a "relatively fine aggregate." In this case, the term "relatively fine aggregate" is defined as an aggregate blend or particle batch containing aggregates as fine as or finer than Size Number 8 Coarse Aggregate as defined in ASTM C 33-97, and in which the final aggregate blend is virtually all less than 0.5 inch diameter and having less than 5% of the aggregate with diameters greater than or equal to 0.375 inch. This includes "concrete sand." Relatively fine aggregates may be determined by following the procedure described in ASTM C136-96.

As summarized above, the present invention relates to compositions which may be used as admixtures in masonry concrete which contain, or which will contain efflorescence control admixtures, such as a fatty acid or fatty acid salt or derivative type efflorescence control admixtures. Thus, an exemplary masonry admixture (composition) of the invention comprises (i) an alkylaryl polyether alcohol having the formula R-Ø-(OCH$_2$CH$_2$)$_x$OH, wherein R is a C$_4$–C$_8$ alkyl group, Ø represents a phenol group, and "X" represents an integer in the range of 3–70; and (ii) at least one efflorescence control admixture, such as a C$_4$–C$_{22}$ fatty acid or its salt or derivative. R is preferably a non-linear (branched) alkyl group, such as a branched octyl group, as in the following structural formula

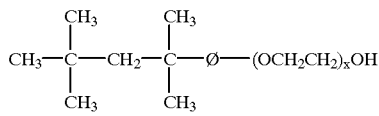

"X," which indicates the average number of ethylene oxide units in the ether side chain, is preferably in the range of 5–30; more preferably, X is in the range of 9–20. The alkylaryl polyether alcohol may be prepared by the reaction of octylphenol with ethylene oxide. Alkylaryl polyether alcohols made by his process are commercially available as surface-active agents from Union Carbide under the tradename TRITON®. Preferably, alkylaryl polyether alcohols having a higher length of polyoxyethylene chain, where X is in the range of 5–20, is preferred for use with masonry concrete as contemplated in the present invention. Preferred commercially available TRITON® agents are available as TRITON® X-45 (where the average value of X is 5); TRITON® X-114 (average value X=7–8); and TRITON® X-100 (average value X=9–10).

Exemplary dosage rates of alkylaryl polyether alcohols are in the range of 0.001 to 5.0 percent by weight based on total dry weight of cement (binder) in the masonry concrete.

Illustrative fatty acid type efflorescence control agents of the invention, as mentioned above, comprise C$_4$–C$_{22}$ fatty acids or their salts or derivatives. The most preferred are lauric (C$_{12}$), myristic (C$_{14}$), palmitic (C$_{16}$), and stearic (C$_{18}$). Exemplary fatty acid salts and derivatives thereof include, without limitation, calcium stearate, zinc stearate, aluminum stearate, butyl oleate, a tall oil fatty acid, coconut fatty acid, or mixture thereof. Preferably, these are used in dispersion form or solution form.

Exemplary dosage rates of exemplary fatty acids (or their salts or derivatives) are in the range of 0.15 to 1.5 percent by weight (solids) based on total dry weight of cement (binder) in the masonry concrete (e.g., solids on solids cement).

When an exemplary alkylaryl polyether alcohol (e.g., TRITON X-100) and an exemplary fatty acid are combined within masonry concrete (which is to be molded into a concrete masonry unit), or combined as a premixed admixture for addition into a masonry concrete, a preferred range for the TRITON:fatty acid is 0.007:1 to 33.0:1 parts by weight dry.

It is believed that masonry concrete containing an alkylaryl polyether alcohol, wherein the alkyl group is a C$_4$–C$_8$ (preferably branched) alkyl group, is novel, and unlike higher chain surface-active agents, such as nonylphenol polyether alcohols, they provide surprisingly good freeze/thaw durability when used with fatty acid type efflorescence control admixtures (ECA) such as calcium stearate dispersion.

Thus, an illustrative masonry concrete composition of the invention comprises a hydratable cement binder (5–25% based on total dry weight of the composition); a fine aggregate portion (75–95% based on total dry weight of the composition); an alkylaryl polyether alcohol having the formula R-Ø-(OCH$_2$CH$_2$)$_x$OH, wherein R is a C$_4$–C$_8$ alkyl group, Ø represents a phenol group, and "X" represents an integer in the range of 3–70; and an efflorescence control agent, such as a fatty acid or its salt or derivative; the composition, when wet, having essentially zero slump when tested by the standard cone method for measuring slump.

Further exemplary concrete admixtures and masonry concretes of the invention comprise the above-described alkylaryl polyether alcohol, and may further comprise another freeze-thaw durability improvement agent such as, in particular, a betaine. Betaines have been used in conventional concrete and mortar and other high fluidity concretes; but neither they, nor air entraining agents of the more conventional type, have been successfully deployed in masonry concrete to form masonry units having improved freeze-thaw (F/T) durability. For example, U.S. Pat. No. 5,679,150 of Kerkar et al. (which patent is incorporated herein fully by reference) discloses that in cements (for concretes and mortars) an oxyalkylene compound, such as an oxyalkylene ether adduct, could be used with a betaine to permit air entrainment in the presence of the oxyalkylene compound which was used as a shrinkage reduction agent. As another example, Japanese Patent Application Kokai No. SHO 55-47259 (Laid Open Date: Apr. 3, 1980) of Kao Corporation disclosed that, in concrete or mortar, carboxybetaines and sulfobetaines, for example, could be employed.

A suitable type of betaine for use in the present invention has the following formula

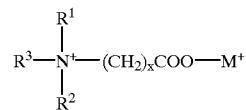

wherein $R^1$, $R^2$, and $R^3$ are independently alkyl groups or alkyl containing moeties, x is 1 to 5, and M is a metal cation, or ammonium. Preferably, M is sodium. Suitable metal cations are derived from any of the alkali, e.g., sodium or alkaline earth metals. Ammonium salts also are suitable. The compounds of this invention are typically added as metal salts.

Preferably, $R^1$ and $R^2$ are C$_1$–C$_4$ alkyl groups, and most preferably methyl groups. Preferable alkyl groups for $R^3$ are C$_{10}$–C$_{28}$ and include alkyl-containing moieties such as alkylamides, alkyl amido alkylenes, and substituted alkyls such as hydroxyalkyls. It is particularly preferred that $R^3$ is a C$_{10}$–C$_{20}$ alkylamido propyl, such as lauramido propyl and cocoamido propyl. Other suitable betaines are listed in U.S. Pat. No. 5,679,150 which is incorporated fully herein by reference.

Another suitable type of betaine, a sulfobetaine, has the general formula

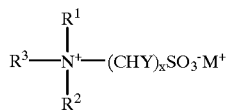

wherein $R^1$, $R^2$, and $R^3$, M and X are described as set forth above and Y is hydrogen or hydroxyl. A preferred sulfobetaine is cocoamido propyl hydroxy sultaine.

Other suitable betaines and sulfobetaines are disclosed in U.S. Pat. No. 4,209,337, the entire content of which is incorporated herein by reference. Methods for preparing betaines and sulfobetaines are known in the art. See U.S. Pat. No. 5,679,150 and references cited therein.

A further exemplary masonry concrete of the present invention therefore comprises masonry concrete, in other words, a hydratable cement binder, such as Portland cement, in the amount of 5–25% based on total dry weight of the composition, a fine aggregate portion comprising 75 to 95% based on total dry weight of solids in the composition; an alkylaryl polyether alcohol having the formula R-Ø-$(OCH_2CH_2)_x OH$, wherein R is a $C_4$–$C_8$ alkyl group, Ø represents a phenol group, and "X" represents an integer in the range of 3–70; and a betaine, preferably a cocoamido propyl betaine or cocoamido hydroxy sultaine, in the amount of 0.05–0.5% (s/s cement). An efflorescence control agent (ECA), such as a fatty acid (or its salts or derivative) may then be used in this illustrative masonry concrete, and further exemplary masonry concrete compositions of the invention thus further comprise an ECA such as calcium stearate, zinc stearate, aluminum, butyl oleate, tall oil fatty acid, a silane, a siloxane, a polyvinyl alcohol, a latex, or mixture thereof. Again, in wet form, the exemplary masonry concrete composition has essentially zero slump when tested by the standard cone method for measuring slump.

An exemplary method of the invention for improving freeze/thaw durability comprises: providing a masonry concrete, comprised of a cement binder and relatively fine aggregate (which was previously defined), and essentially a zero slump (e.g., slump of 0–0.75 when tested by the standard cone method); and incorporating into said masonry concrete (i) an alkylaryl polyether alcohol having the formula R-Ø-$(OCH_2CH_2)_x OH$, wherein R is a $C_4$–$C_8$ alkyl group, Ø represents a phenol group, and "X" represents an integer in the range of 3–70; and, optionally, at least one or both of (ii) an efflorescence control agent, such as a $C_4$–$C_{22}$ fatty acid or its salt or derivative, preferably calcium stearate, and/or (iii) a betaine. When preferred range for component (i) is 0.001 to 5.0%, for component (ii) the range is 0.15 to 1.5%, and for component (iii) the range is 0.05 to 5.0%, (all percentages herein being given terms of dry weight of cement in the masonry concrete). If the alkylaryl polyether alcohol and betaine are used in combination, then preferably they are combined in a 0.1:5 to 5:0 ratio.

The present invention also provides an exemplary method for making a freeze/thaw durability admixture for masonry concrete. An illustrative method comprises (i) providing an efflorescence control agent (e.g., fatty acid or salt or derivative thereof); (ii) optionally heating the efflorescence control agent (if not in liquid form) so as to render it into liquid form; and (iii) combining said efflorescence control agent while in liquid form with a hydroxide solution (e.g., calcium hydroxide, potassium hydroxide, sodium hydroxide, etc.) to obtain the salt of the efflorescence control agent (e.g., salt of the fatty acid), the hydroxide solution further comprising an alkylaryl polyether alcohol having a $C_4$–$C_8$ alkyl group (preferably, branched octyl group). Optionally, but preferably, this dispersion is further milled or ground to reduce the size of dispersed particles (e.g., fatty acid salt particles within the dispersion).

The present invention may be further appreciated in light of the following examples.

EXAMPLE 1

Masonry units (e.g., segmental retaining wall) can be made using the folllowing mix: approximately 1800 pounds of concrete sand, 3500 pounds of high friction sand, and 1900 pounds of crushed limestone. Approximately, 650 pounds of Portland cement was added to the batch. Water was added to the batch which was then mixed for approximately 5 minute in a spiral ribbon mixer. The efflorescence control agent was a calcium stearate-based dispersion available from Grace Construction Products under the name DRY-BLOCK®II. The alkylaryl polyether alcohol is available from Union Carbon under the tradename TRITON X-100®.

Various admixtures (as summarized in Table 1) were added along with mix water. Small amounts of plasticizer were added to all batches to aid the molding and de-molding operation. Measured batches of the mix were fed into the molding machine and molded into solid units (8"×6"×18") using a commercial block-making machine. After molding, the units were cured in a steam kiln (maintained at~110° F.) for approximately 10 hours. The masonry further cured in ambient air for at least 28 days prior to testing.

TABLE 1

| Sample | Admixture Combination | Plasticizer Dose, oz/cwt | ECA Type | ECA Dose, oz/cwt | on wt. of cement or oz/cwt |
|---|---|---|---|---|---|
| 1 | Blank | 1 | CSD | 11 | — |
| 2 | Gum Rosin (dry) | 1 | CSD | 11 | 0.25% |
| 3 | Vinsol Resin (dry) | 1 | CSD | 11 | 0.40% |
| 4 | Alkylaryl polyether alcohol | 1 | CSD | 11 | 3.0% |

Samples were cut from the masonry units after air-curing using a wet saw and dried in air for approximately 48 hours. The samples were then subjected to F/T testing using ASTM C1262 (1995) test procedure. Results of the F/T testing are summarized in FIG. 1.

As seen in FIG. 1, the reference mix #1 registered more than 1 weight percentage loss before 100 F/T cycles, indicating the adverse effect of the fatty acid-based efflorescence control admixtures (ECAs) on the F/T durability of the masonry units. Incorporation of conventional air entraining admixtures, such as gum rosin (sample #2) and Vinsol resin (sample #3) in combination with fatty acid-based ECA seem adversely to effect on the F/T durability of the masonry concrete. Samples containing the alkylaryl polyether alcohol (e.g., TRITON® X-100), however, demonstrated superior F/T performance, as shown by mix #4 which demonstrated significantly less than 1 wt. % loss in weight even after 100 F/T cycles.

EXAMPLE II

A test can be done to illustrate that nonylphenol polyether alcohols, having longer alkyl groups than the $C_4$–$C_8$ alkyl groups of the alkylaryl polyether alcohols contemplated in the present invention, do not work to improve F/T durability of masonry units when combined with fatty acid based efflorescence control admixtures.

Masonry blocks were made using the following mix proportions: approximately 29 pounds of limestone and 29 pounds of concrete sand. Approximately 6 pounds of Portland cement was added to the batch. Water was added to the batch which was then mixed for approximately 5 minutes in a horizontal pan mixer. The efflorescence control agent (ECA) was calcium stereate dispersion (Calsan 50). Various admixtures (as summarized in table 2) were added along with mix water. Nonylphenol polyether alcohol (Iconol, BASF) was added at 2 oz/cwt (cwt=100 lbs. cement) to mix #6. An octylphenol ethoxylate (e.g., TRITON® X-100) was added at 3 oz/cwt in sample #7. Measured batches of the mix were poured into a mold and molded into cylindrical solid units (3" diameter×3" height) using a commercial compacting machine. After molding, the units were cured in a steam kiln (maintained at ~140° F.) for approximately 8 hours. The masonry units were further cured in ambient air for at least 28 days prior to testing.

TABLE 2

| Sample | Admixture Combination | ECA Type | ECA Dose, oz/cwt | Admixture Dose oz/cwt |
|---|---|---|---|---|
| 5 | Blank | CSD | 20 | — |
| 6 | nonylphenol | CSD | 20 | 2 |
| 7 | octylphenol | CSD | 20 | 3 |

Samples were cut from the masonry units after air-curing using a wet saw and dried in air for approximately 48 hours. The samples were then subjected to F/T testing using ASTM C1262 (1995) test procedure. Results of the F/T testing are illustrated graphically in FIG. 2.

Figure 2:
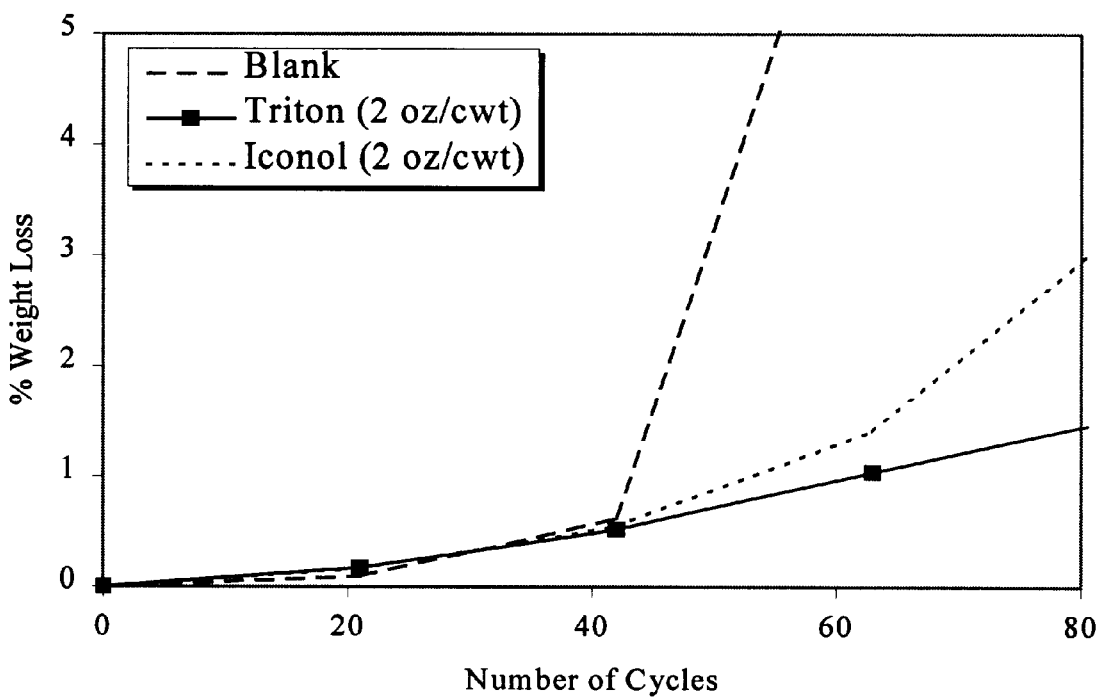

As seen in FIG. 2, the reference sample #5 registered over 5 weight percentage loss before 60 F/T cycles, indicating the adverse effect of the fatty acid-based efflorescence control admixtures (FCAs) on the F/T durability of the masonry units. Incorporation of nonylphenol polyether alcohols admixtures, such as ICONOLS® (sample #6), in combination with fatty acid-based ECA does not seem to help the F/T durability of the masonry concrete (weight loss of ~5% at 100 cycles). Samples containing the alkylaryl polyether alcohol (e.g., TRITON® X-100), however, demonstrated superior F/T performance. The samples containing TRITON® X-100 (sample #7) registered only 0.5 wt. % loss in weight even after 100 F/T cycles.

EXAMPLE III

A test was done to illustrate that an alkylaryl polyether alcohol ($C_4$–$C_8$ alkyl groups) works when combined with fatty acid based efflorescence control admixtures and tested for F/T using ASTM C1262 (1995) in presence of water or a 3% saline solution.

Masonry blocks can be made using the following mix: approximately 5600 pounds of coarse aggregate and 2400 pounds of sand. Approximately 800 pounds of Portland cement combined with 400 pounds of slag was added to the batch. Water was added to the batch that was then mixed for approximately 5 minutes in a spiral ribbon mixer. The efflorescence control agent was tall-oil fatty acid based (RX-901) sold by W. R. Grace. TRITON® X-100, used at two different dosages (as summarized in Table 3 below) was added along with mix water. Measured batches of the mix were fed into the molding machine and molded into solid units (8"×6"×18") using a commercial block-making machine. After molding, the units were cured in a steam kiln (maintained at ~110° F.) for approximately 10 hours. The masonry units were further cured in ambient air for at least 28 days prior to testing.

TABLE 3

| Mix # | Admixture Combination | ECA Type | ECA Dose, oz/cwt | Admixture Dose oz/cwt |
|---|---|---|---|---|
| 8 | Blank | — | — | — |
| 9 | tall oil fatty acid | TOFA (tall oil fatty acid) | 4 | — |
| 10 | octylphenol polyether alcohol | TOFA | 4 | 3 |
| 11 | octylphenol polyether alcohol | TOFA | 4 | 5 |

Samples were cut from the masonry units after air-curing using a wet saw and dried in air for approximately 48 hours. The samples were then subjected to F/T testing using ASTM C1262 (1995) test procedure in presence of water and a 3% saline solution. Results of the F/T testing are depicted graphically in FIG. 3 (in water) and FIG. 4 (in saline).

Figure 3:
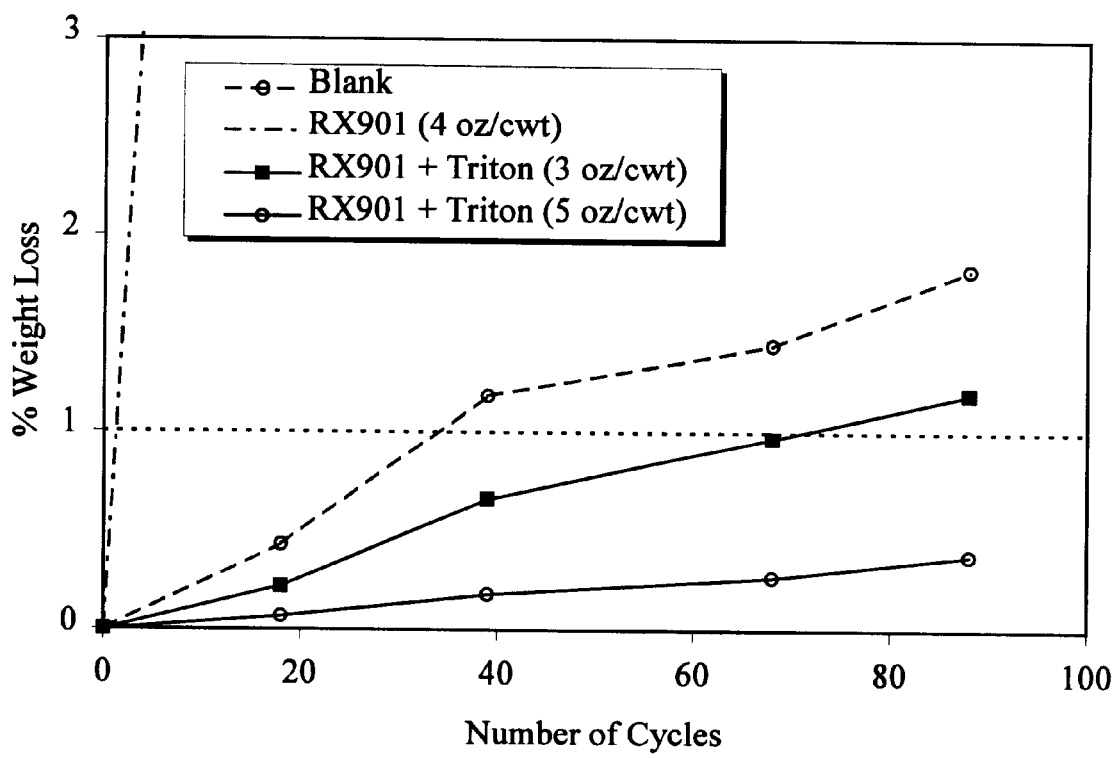

As seen in FIG. 3, the reference sample #9 registered over 5 weight percentage before 10 F/T cycles in water, indicating the adverse effect of the fatty acid-based efflorescence control admixtures (ECAs) on the F/T durability of the masonry units. Incorporation of octylphenol polyether alcohol (e.g., TRITON® X-100) at the dosage of 3 or 5 oz/cwt results in a significant reduction in the weight loss at 100 cycles.

Figure 4:
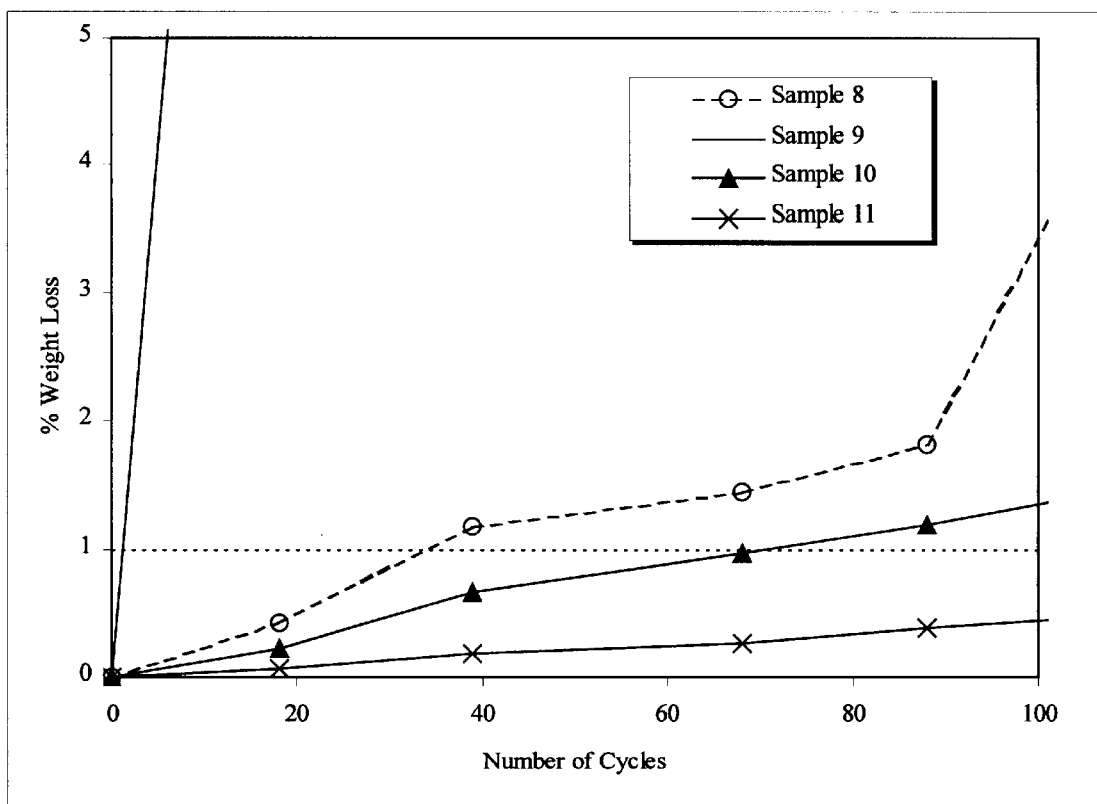

As seen in FIG. 4, the reference sample #8 registered a weight percentage loss of 1.8% at 88 cycles. Sample #9 containing the efflorescence control agent registered an extremely high weight percentage before 20 F/T cycles, indicating the adverse effect of the saline solution in combination with the presence of the fatty acid-based efflorescence control admixtures (ECAs) on the F/T durability of the masonry units. Samples containing the alkylaryl polyether alcohol ($C_4$–$C_8$ alkyl groups) such as TRITON® X-100, however, demonstrated superior F/T performance. The samples containing TRITON® X-100 at the dosage of 3 oz/cwt (sample #10) showed a reduction of about 35% and 95% in weight loss compared to the blank mix (sample #8) and to the RX901 sample mix (#9) respectively. The samples containing TRITON® X-100 at the dosage of 5 oz/cwt (sample #11) have registered significantly less than 1% loss in weight even after 100 F/T cycles in presence of saline solution.

These results show that the performance of the alkylaryl polyether alcohol ($C_4$–$C_8$ alkyl groups) in masonry is unexpected because it not only improves the F/T durability in presence of a saline solution of masonry concrete which contained a fatty acid type efflorescence control agent (ECA) but also it improves the base material containing no ECA.

The foregoing examples are provided for illustration only and are not intended to limit the scope of the invention.

It is claimed:

1. A composition comprising: an alkylaryl polyether alcohol having the formula R-Ø-$(OCH_2CH_2)_x$OH wherein R is a $C_4$–$C_8$ alkyl group, Ø represents a phenol group, and x represents an integer in the range of 3–70; and at least one efflorescence control admixture comprise a $C_4$–$C_{22}$ fatty acid or salt or derivative thereof, a silane, a siloxane, a polyvinyl alcohol, latex, or mixture thereof; said alkylaryl polyether alcohol and said at least one efflorescence control admixture being present in said composition in a ratio of 0.007–33.0: 1 based on parts by weight.

2. The composition of claim 1 wherein R is a branched alkyl group.

3. The composition of claim 2 wherein R is a branched octyl group.

4. The composition of claim 1 wherein x is in the range of 5–30.

5. The composition of clam 4 wherein x is in the range of 9–20.

6. The composition of claim 1 wherein said fatty acid is selected from the group consisting of stearic acid, myristic acid, palmitic acid, and oleic acid.

7. The composition of claim 1 wherein said alkylaryl polyether alcohol is prepared by the reaction of octylphenol with ethylene oxide.

8. The composition of claim 1 wherein said alkylaryl polyether alcohol has the general formula $(CH_3)_3C—CH_2—C(CH_3)_2\text{-}\emptyset\text{-}(OCH_2CH_2)_xOH$ wherein $\emptyset$ represents a phenol group and x represents an integer in the range of 5–20.

9. The composition of claim 8 wherein said at least one efflorescence control admixture comprises calcium stearate, zinc stearate, aluminum stearate, butyl oleate, tall oil fatty acid, coconut fatty acid, or mixture thereof.

10. The composition of claim 1 further comprising a betaine having the formula $(R^3)(R^1)(R^2)N^+—(CH_2)_xCOO^-M^+$ wherein $R^1$, $R^2$, and $R^3$ are independently alkyl groups or alkyl containing moeties attached to nitrogen ($N^+$); x is 1 to 5; and M is a metal cation or ammonium; said betaine and said alkylaryl polyether alcohol between present in said composition in a ratio of 0–5:1.

11. A masonry concrete composition comprising: a hydratable cement binder in the amount of 5–25% based on total dry weight of the composition; a fine aggregate in the amount of 75–95% based on total dry weight of the composition, said fine aggregate having a fineness equal to or finer than Size Number 8 Coarse Aggregate as defined in ASTM C 33-97, wherein said fine aggregate has a diameter less than 0.5 inch diameter, with less than 5% of said fine aggregate having a diameter greater than or equal to 0.375 inch; and an alkylaryl polyether alcohol in the amount of 0.001 to 5.0 percent by weight based on total dry weight of cement binder, said alkylaryl polyether alcohol having the formula $R\text{-}\emptyset\text{-}(OCH_2CH_2)_xOH$, wherein R is a $C_4$–$C_8$ alkyl group, $\emptyset$ represents a phenol group, and x represents an integer in the range of 3–70; the composition, when wet, having essential zero slump when tested by the standard cone method for measuring slump.

12. The masonry concrete composition of claim 11 further comprising a $C_4$–$C_{22}$ fatty acid or salt or derivative thereof in the amount of 0.15–1.5% based on dry weight of cement binder.

13. The masonry concrete composition of claim 11 wherein said alkylaryl polyether alcohol has the general formula $(CH_3)_3C—CH_2—C(CH_3)_2\text{-}\emptyset\text{-}(OCH_2CH_2)_xOH$ wherein $\emptyset$ represents a phenol group and x represents an integer in the range of 5–20.

14. Method for improving freeze/thaw durability of masonry concrete, comprising: incorporating into a masonry concrete having a hydratable cement binder an alkylaryl polyether alcohol in an amount of 0.001 to 5.0 percent by weight based on total dry weight of said cement binder, said alkylaryl polyether alcohol having the formula $R\text{-}\emptyset\text{-}(OCH_2CH_2)_xOH$, wherein R is a $C_4$–$C_8$ alkyl group, $\emptyset$ represents a phenol group, and x represents an integer in the range of 3–70, said masonry concrete comprising said cement binder in an amount of 5–25% based on total dry weight of the masonry concrete and a fine aggregate in an amount of 75–95% based on total dry weight of the masonry concrete, said fine aggregate having a fineness equal to or finer than Size Number 8 Coarse Aggregate as defined in ASTM C 33-97, wherein said aggregate has a diameter less than 0.5 inch, with less than 5% of said aggregate having a diameter greater than or equal to 0.375 inch; said masonry concrete, when wet, having essentially zero slump when tested by the standard cone method for measuring slump.

15. The method of claim 14 further comprising incorporating into said masonry concrete a $C_4$–$C_{22}$ fatty acid or salt or derivative thereof in the amount of 0.15–1.5% based on dry weight of cement binder.

16. A process for preparing a composition for improving freeze-thaw durability of masonry concrete, comprising: providing at least one efflorescence control admixture comprising a $C_4$–$C_{22}$ fatty add or salt or derivative thereof; heating said efflorescence control admixture if it is in solid form so as to render it into liquid form; and introducing said efflorescence control admixture when in a liquid form to a hydroxide solution having therein an alkylaryl polyether alcohol having the formula $R\text{-}\emptyset\text{-}(OCH_2CH_2)_xOH$, wherein R is a $C_4$–$C_8$ alkyd group, $\emptyset$ represents a phenol group, and x represents an integer in the range of 3–70.

17. The process of claim 16 wherein said at least one efflorescence control admixture comprises a fatty acid or salt or derivative thereof, and said hydroxide solution comprises calcium hydroxide.

18. The process of claim 17 wherein said fatty acid comprises a stearic acid.

* * * * *